United States Patent [19]

Pfirrmann et al.

[11] Patent Number: 5,461,097
[45] Date of Patent: Oct. 24, 1995

[54] STABILIZATION OF POLYETHYLENE GRIT

[75] Inventors: Guenther Pfirrmann, Ludwigshafen; Dieter Boes, Wiesloch; Rudolf Paatz, Weisenheim, all of Germany

[73] Assignee: BASF Aktiengesellschaft, Ludwigshafen, Germany

[21] Appl. No.: 158,780

[22] Filed: Dec. 1, 1993

[30] Foreign Application Priority Data

Dec. 3, 1992 [DE] Germany ............... 42 40 694.3

[51] Int. Cl.$^6$ ..................................... C08K 5/526
[52] U.S. Cl. ................. 524/151; 524/153; 524/291; 524/303; 524/353
[58] Field of Search ................. 524/151, 153, 524/303, 304, 353, 291

[56] References Cited

U.S. PATENT DOCUMENTS

| | | | |
|---|---|---|---|
| 3,533,989 | 10/1970 | Wescott | 524/113 |
| 3,558,554 | 1/1971 | Kuriyama et al. | 524/151 |
| 3,932,323 | 1/1976 | Perry | 523/351 |
| 4,187,212 | 2/1980 | Zinke et al. | 524/153 |
| 4,290,941 | 9/1981 | Zinke et al. | 524/153 |
| 4,490,323 | 12/1984 | Thomson | 523/351 |
| 4,510,271 | 4/1985 | Muhle et al. | 523/351 |
| 4,891,392 | 1/1990 | Abe et al. | 523/351 |
| 5,053,444 | 10/1991 | Trotoir | 523/351 |

FOREIGN PATENT DOCUMENTS

| | | |
|---|---|---|
| 1078772 | 8/1967 | United Kingdom . |
| 2261667 | 5/1993 | United Kingdom . |

*Primary Examiner*—Veronica P. Hoke
*Attorney, Agent, or Firm*—Keil & Weinkauf

[57] ABSTRACT

A process is described for stabilizing polyethylene grit in which a sterically hindered phenol and an ester of phosphorous or of hypophosphorous acid are added to said grit, wherein the sterically hindered phenol in melt form and the ester of phosphorous or of hypophosphorous acid are made available to the polyethylene grit within a ground polyolefin matrix in which the ester is incorporated, the polyolefin matrix being compatible with the polyethylene grit.

11 Claims, No Drawings

STABILIZATION OF POLYETHYLENE GRIT

The present invention relates to a process for stabilizing polyethylene grit, in which a sterically hindered phenol and an ester of phosphorous acid or of hypophosphorous acid are added to the grit.

The present invention also relates to stabilized polyethylene grit obtainable by the novel process.

It is known that esters of phosphorous acid can be used as stabilizers in polyolefins. Often aryl-containing phosphites together with phenolic compounds and thioesters are used in order to protect the polyolefins treated with them in particular against thermo-oxidative damage due to the attack of oxygen molecules (U.S. Pat. No. 3,558,554). The phenolic compounds act in particular as radical scavengers for oxygen radicals. Stabilizer mixtures of phosphites and phenols are inter alia also described in U.S. Pat. No. 3,533,989 and GB-A 1 078 772.

The use of stabilizer systems of triaryl phosphites and phenols in polyolefins is also known from DE-C 26 06 358, the effectiveness of the stabilizer mixtures employed being manifested in particular by the virtual colorlessness of the resultant polyolefins.

However, difficulties frequently arise when such stabilizer mixtures are used for polyethylene grit, especially if the stabilizers are applied to the surface of the grit as a powder or as an undiluted liquid. Since the adhesion forces between the largely nonpolar polyethylene surface and the partly polar stabilizers are relatively small, the latter can readily become detached from the surface of the grit. Consequently, inhomogeneous mixtures can often be formed during the processing of the polyethylene grit stabilized in this way, these inhomogeneous mixtures resulting, among other things, in nonuniform wall thickness distributions, inhomogeneous surfaces and nonuniform colorations of the moldings and films produced from the polyethylene grit. Moreover, the stabilizer particles that have become detached from the grit surface can be deposited in the feed sections of mixing apparatus, for example of extruders, and thereby reduce their throughput.

It is an object of the present invention to overcome the aforementioned problems and to develop an improved process for stabilizing polyethylene grit that prevents, in particular, stabilizer particles becoming detached from the grit surface.

We have found that this object is achieved by a process in which a sterically hindered phenol and an ester of phosphorous acid or of hypophosphorous acid are added to the grit, wherein the ester of phosphorous acid or of hypophosphorous acid is made available to the polyethylene grit within a ground polyolefin matrix in which the ester is incorporated, the polyolefin matrix being compatible with the polyethylene grit.

In the process of the invention the sterically hindered phenol is mixed with the polyethylene grit preferably in amounts of from 0.01 to 1% by weight, in particular in amounts of from 0.1 to 0.4% by weight, based on the polyethylene grit. The ground polyolefin matrix in which the ester of phosphorous acid or of hypophosphorous acid is incorporated is mixed with the polyethylene grit preferably in amounts of from 0.1 to 10% by weight, in particular in amounts of from 0.1 to 5% by weight. Here too the reference to % by weight is based on the polyethylene grit.

The sterically hindered phenols used are in particular the esters of β-hydroxyphenylpropionic acid, which in turn may contain as hydroxyl compounds monohydric or polyhydric alcohols, for example methanol, ethanol, propanol, isopropanol, n-butanol, iso-butanol, tert-butanol, pentanol, hexanol, octadecanol, 1,6-hexanediol, ethylene glycol, thiodiethylene glycol, neopentyl glycol or pentaerythritol. Further particularly suitable sterically hindered phenols contain several phenolic groups in the molecule.

Particularly suitable sterically hindered phenols are, inter alia, octadecyl 3-(3,5-di-tert-butyl-4-hydroxyphenyl)propionate, pentaerythritol tetrakis[3-(3,5-di-tert-butyl-4-hydroxyphenyl)propionate], thiodiethylene glycol β-[4-hydroxy-3, 5-di-tert-butyl-phenyl]propionate and 1,3,5-trimethyl-2,4,6-tris(3,5-di-tert-butyl-4-hydroxybenzyl)benzene.

The preparation of such sterically hindered phenols is known to the average person skilled in the art, and accordingly reference should be made in this connection to the relevant specialist literature.

Preferred esters of phosphorous acid or of hypophosphorous acid are especially alkyl-containing aromatic esters of these acids. Such esters include in particular triaryl phosphites (esters of phosphorous acid) and tetrakis-diphosphonites (esters of hypophosphorous acid). Particularly preferred esters are tris[2,4-di-tert-butylphenyl] phosphite and tetrakis( 2,4-di-tert-butylphenyl)-4,4'-biphenylene diphosphonite. Mixtures of such phosphites and phosphonites and diphosphonites may also be used in conventional quantitative ratios.

The preparation of such esters of phosphorous acid or of hypophosphorous acid may be performed according to conventional methods known to the average person skilled in the art.

The process according to the invention is suitable for stabilizing polyethylene grit, in particular HDPE (high density polyethylene) grit. Such polyethylene grits normally have densities of from 0.93 to 0.98 g/cm$^3$ and melt flow rates (MFR) of less than 20 g/10 minutes at 190° C. and under a load of 2.16 kg (MFR measured according to ISO 1133). The melt flow rate corresponds to the amount of polymer that is expressed within 10 minutes from the standard test equipment according to ISO 1133 at 190° C. and under a load of 2.16 kg.

The preparation of such polyethylenes is normally performed by low-pressure polymerization with metal-containing catalysts, for example using titanium- and aluminum-containing Ziegler catalysts, or by using Phillips catalysts based on chromium-containing compounds. The polymerization reaction can be carried out in reactors conventionally used in the art, and also in the gas phase, in solution, or in a suspension.

According to the process of the invention the ester of phosphorous acid or of hypophosphorous acid is made available to the polyethylene grit within a ground polyolefin matrix in which the ester is incorporated and which is compatible with the polyethylene grit. Preferably, a matrix of polyethylene, in particular of HDPE, is used. Such a polyolefin matrix is normally also termed a masterbatch.

According to a preferred variant of the novel process the sterically hindered phenol and the ground polyolefin matrix containing an ester of phosphorous acid or of hypophosphorous acid is added to the polyethylene grit in at least two separate stages. Preferably, first of all a sterically hindered phenol is added to the polyethylene grit in a first stage. This is performed in apparatus conventionally used in plastics technology for mixing substances, for example in mixers, extruders, kneaders or in mills. The sterically hindered phenol can be used as a pure substance and also in the form of a solution in an inert solvent. The sterically hindered phenol is preferably incorporated in droplet form or sprayed. It may be recommended to combine the sterically hindered phenol at above its melting point with the polyethylene grit, for example at from 80° to 100° C. in the case of octadecyl 3-(3,5-di-tert-butyl-4-hydroxyphenyl)propionate. The remaining reaction conditions such as pressure and residence times depend decisively on the other, abovementioned reaction conditions and are familiar to the person skilled in the art.

Following this, the ground polyolefin matrix containing an ester of phosphorous or hypophosphorous acid is added in a second stage to the polyethylene grit. This addition takes place in conventional apparatus, for example in mixers, extruders, kneaders or mills, and does not exhibit any particular features as regards the process parameters that have to be maintained. Conventional process parameters are in this case temperatures below the melting point of polyethylene and the ester of phosphorous or hypophosphorous acid of from about 10° to 60° C., in particular from about 20° to 40° C.

A further variant of the process according to the invention is the incorporation, in one process stage, of the ground polyolefin matrix (masterbatch) containing the ester of phosphorous or hypophosphorous acid together with the sterically hindered phenol into the polyethylene grit. In this case the incorporation is performed at above the melting point of the sterically hindered phenol, for example at from 80° to 100° C. in the case of octadecyl 3-(3,5-di-tert-butyl-4-hydroxyphenyl)propionate.

The incorporation of the esters into the polyolefin matrix also takes place in mixers, extruders, kneaders or mills, under normal process parameters well known to the person skilled in the art, for example at from 180° to 220° C. and residence times of from 3 to 7 minutes. The esters are usually incorporated into the polyolefin matrix in amounts of from 5 to 50% by weight, preferably from 10 to 30% by weight, based on the matrix. It is recommended that the esters be incorporated into the molten polyolefin matrix. One or more different esters of phosphorous acid or hypophosphorous acid may be mixed into this polymer matrix. If necessary, minor amounts of the sterically hindered phenol may in addition also be incorporated in the polymer matrix. In this case the quantitative ratio of ester to sterically hindered phenol is about 5:1 to about 20:1.

The polyolefin matrix (masterbatch) obtainable in this way is preferably also ground to grain sizes of <3 mm, in particular <2 mm, before it is used in the process according to the invention. This grinding is usually performed in surface plate mills.

The process according to the invention permits, among other things, a better preliminary distribution of the phenols and phosphites/phosphonites used as stabilizers and an easier homogenization of the stabilizers with the polyethylene grit. A separation of the stabilizers from the grit surface can thereby be prevented.

The stabilized polyethylene grit obtainable in this way is notable in particular for an improved stabilizer adhesion and sedimentation stability.

In addition to the sterically hindered phenols and the esters of phosphorous or hypophosphorous acids used as stabilizers, the stabilized polyethylene grits may also contain additional additives such as lubricants, antistatics, UV-absorbers, viscosity modifiers, anti-blocking agents, impact modifiers, flatting agents, flame retardants, biostabilizers, nucleating agents or hardeners.

EXAMPLE AND COMPARATIVE EXAMPLES A TO E

EXAMPLE a) Preparation of a polyethylene matrix (masterbatch) from an ester of phosphorous acid and a polyethylene 80 parts by weight of a polyethylene having a density of 0.95 g/cm$^3$ and a melt flow rate MFR 190/2.16 of 0.2 g/10 minutes (according to ISO 1133) were added to a kneader at 200° C. together with 20 parts by weight of a mixture of 9 parts of tris[2,4-di-tert-butylphenyl]phosphite and 1 part of octadecyl 3-(3,5-di-tert-butyl-4-hydroxyphenyl)propionate and mixed together for 5 minutes. The polyethylene matrix (masterbatch) prepared in this way was then granulated in an extruder at 190° C. and ground in a mill to particle sizes of about <1 mm.

b) Preparation of a pre-stabilized polyethylene grit 100 kg of a polyethylene grit having a density of 0.954 g/cm$^3$ and a melt flow rate of 2 g/10 minutes at 190° C. and under a load of 21.6 kg (according to ISO 1133) were mixed in a mixer at 90° C. for 30 minutes with 0.15% by weight, based on the polyethylene grit, of octadecyl 3-(3,5-di-tert-butyl-4-hydroxyphenyl)propionate. The sterically hindered phenol was metered in as a melt.

c) Mixing of the polyethylene matrix (masterbatch) prepared in a) with the pre-stabilized polyethylene grit according to b)

100 kg of the pre-stabilized polyethylene grit obtained in b) were combined in a mixer at 23° C. with 0.4% by weight, based on the polyethylene grit, of the masterbatch prepared according to a), and mixed together for 30 minutes.

The stabilizer adhesion (sedimentation stability), extruder throughput and the stabilizer action (Brabender test) for this example according to the invention can be obtained from the following table.

COMPARATIVE EXAMPLE A

Corresponding to the procedure of section b) of the example according to the invention, 100 kg of the same polyethylene grit were mixed with 0.15% by weight, based on the polyethylene grit, of octadecyl 3-(3,5-di-tert-butyl-4-hydroxyphenyl)propionate under the same conditions.

COMPARATIVE EXAMPLE B 100 kg of the same polyethylene grit were mixed in a mixer at 23° C. for 30 minutes with 0.15% by weight, based on the polyethylene grit, of a mixture comprising 3 parts of tris[2,4-di-tert-butylphenyl]phosphite and 1 part of pentaerythritol tetrakis[3-(3,5-di-tert-butyl-4-hydroxyphenyl) propionate]. The mixing conditions correspond to section c) of the example according to the invention.

COMPARATIVE EXAMPLE C 100 kg of the same polyethylene grit were mixed with 0.15% by weight, based on the polyethylene grit, of a mixture comprising 10 parts of 1,3,5-trimethyl-2,4,6-tris(3,5-di-tert-butyl-4-hydroxybenzyl)benzene and 3 parts of tris [2,4-di-tert-butylphenyl]phosphite according to Comparative Example B.

COMPARATIVE EXAMPLE D

I. 9 parts of tris[2,4-di-tert-butylphenyl]phosphite and 1 part of octadecyl 3-(3,5-di-tert-butyl-4-hydroxyphenyl)propionate were first of all loosely mixed at 30° C. for 30 minutes in an intensive mixer.

II. Corresponding to the procedure of section b) of the example according to the invention, 100 kg of the same polyethylene grit were mixed with 0.15% by weight, based on the polyethylene grit, of octadecyl 3-(3,5-di-tert-butyl-4-hydroxyphenyl)propionate under the same conditions.

III. The pre-stabilized polyethylene grit obtained was then mixed with 0.05% by weight, based on the polyethylene grit, of the loose mixture obtained from section I under the same conditions as described in section c) of the example according to the invention.

COMPARATIVE EXAMPLE E

Comparative Example D was repeated, the loose mixture obtained from section I being combined in the form of a low-dust, coarse-grained commercially available compacted material as in section III, adapted to the polyethylene grit, with the pre-stabilized polyethylene grit.

The stabilizer adhesion (sedimentation stability), extruder throughput and the stabilizer action (Brabender test) for the Comparative Examples A to E are compared with the example according to the invention in the following table.

TABLE

|  | Example according to the invention | Comparative Examples | | | | |
| --- | --- | --- | --- | --- | --- | --- |
|  |  | A | B | C | D | E |
| Stabilizer adhesion/ sedimentation stability [%] | 90 | 90 | 40 | 20 | 70 | 80 |
| Extruder throughput [kg/h] | 27 | 27 | 21 | 21 | 24 | 24 |
| Stabilizer action Brabender test [min] | 18 | 6 | 15 | 17 | 10 | 10 |

The determination of the stabilizer adhesion/sedimentation stability was performed in laboratory shaking tests with low-surface-tension water as separation medium (vibration mixer). The percentage of stabilizer remaining adhering to the polyethylene grit was determined.

In this test about 5 g of the stabilized polyethylene grit were shaken for 10 minutes with a shaker in a 250 ml conical flask with about 50 ml of water and about 20 mg of a wetting agent (Lutensol® FAS from BASF Aktiengesellschaft). The stabilized polyethylene grit floating on the water was then separated from the water by means of a suction device and dried. The difference between the stabilizer content in the grit expressed in percent before and after the shaking indicates the percentage of non-adhering stabilizer that was present in the grit.

The extruder throughput was determined in a Kautex V8 blow molding unit at a screw speed of 120 revolutions per minute. The extruder throughput was expressed in kg per hour.

The stabilizer action was determined from the Brabender test. The stabilized melt (head temperature 210° C.) was kneaded in a Brabender plastograph until the torque increased. A high stability time within which crosslinking reactions practically cannot take place is connected with a reliable processability in practice without interfering surface defects such as crosslinking knots in the case of blow-molded parts (fibers, canisters, etc.).

It can be seen from the table that, among other things, only the example according to the invention exhibits an extremely favorable combination of high stabilizer adhesion, high extruder throughput and an extremely long-lasting stabilizer action.

We claim:

1. A process for stabilizing polyethylene grit, in which a sterically hindered phenol and an ester of phosphorous acid or of hypophosphorous acid are added to the grit, wherein the ester of phosphorous or of hypophosphorous acid is made available to the polyethylene grit within a ground polyolefin-based masterbatch having a particle size of less than 3 mm in which said ester comprises from about 5 to about 50 weight-% of the masterbatch and is incorporated into the masterbatch by melt blending, the polyolefin matrix being compatible with the polyethylene grit.

2. A process as defined in claim 1, wherein polyethylene is used as ground polyolefin based masterbatch.

3. A process as defined in claim 1, wherein the sterically hindered phenol is used in amounts of from 0.01 to 1% by weight, based on the polyethylene grit.

4. A process as defined in claim 1, wherein the ground polyolefin based masterbatch is used in amounts of from 0.1 to 10% by weight, based on the polyethylene grit.

5. A process as defined in claim 1, wherein the sterically hindered phenol and the ground polyolefin based masterbatch containing an ester of phosphorous acid or of hypophosphorous acid are added to the polyethylene grit in at least two separate stages.

6. A process as defined in claim 5, wherein first of all a sterically hindered phenol is added to the polyethylene grit in a first stage and the ground polyolefin based masterbatch containing an ester of phosphorous acid or of hypophosphorous acid is then added in a second stage.

7. A process as defined in claim 1, wherein the sterically hindered phenol and the ground polyolefin based masterbatch containing an ester of phosphorous acid or of hypophosphorous acid is added in one process stage to the polyethylene grit.

8. A process as defined in claim 1, wherein blending of the polyethylene grit with the sterically hindered phenol is carried out at temperatures above the melting point of the sterically hindered phenol.

9. A process as defined in claim 1, wherein esters of β-hydroxyphenylpropionic acid are used as sterically hindered phenols.

10. A process as defined in claim 1, wherein alkyl-containing aromatic esters of phosphorous acid or of hypophosphorous acid are used in the ground polyolefin based masterbatch.

11. Stabilized polyethylene grit obtained by a process as defined in claim 1.

* * * * *